US009650963B2

(12) United States Patent
Nampy et al.

(10) Patent No.: US 9,650,963 B2
(45) Date of Patent: May 16, 2017

(54) ACOUSTIC STRUCTURAL PANEL WITH HERRINGBONE CORE

(71) Applicant: ROHR, Inc., Chula Vista, CA (US)

(72) Inventors: Sreenivas Narayanan Nampy, Chula Vista, CA (US); Charles Michael Biset, San Diego, CA (US); Christian Soria, La Mesa, CA (US)

(73) Assignee: Rohr, Inc., Chula Vista, CA (US)

( * ) Notice: Subject to any disclaimer, the term of this patent is extended or adjusted under 35 U.S.C. 154(b) by 177 days.

(21) Appl. No.: 14/609,408

(22) Filed: Jan. 29, 2015

(65) Prior Publication Data

US 2016/0312709 A1    Oct. 27, 2016

(51) Int. Cl.
| F02C 7/24 | (2006.01) |
| B64D 33/02 | (2006.01) |
| F02K 1/82 | (2006.01) |
| F02C 7/045 | (2006.01) |
| G10K 11/172 | (2006.01) |
| F01N 1/24 | (2006.01) |
| G10K 11/168 | (2006.01) |

(52) U.S. Cl.
CPC .............. F02C 7/24 (2013.01); B64D 33/02 (2013.01); F01N 1/24 (2013.01); F02C 7/045 (2013.01); F02K 1/827 (2013.01); G10K 11/168 (2013.01); G10K 11/172 (2013.01); B64D 2033/0206 (2013.01); Y02T 50/672 (2013.01)

(58) Field of Classification Search
CPC ............ F02C 7/24; F01N 1/24; G10K 11/168
USPC ........................................ 181/213
See application file for complete search history.

(56) References Cited

U.S. PATENT DOCUMENTS

| 3,734,234 | A | | 5/1973 | Wirt | |
| 3,821,999 | A | | 7/1974 | Guess et al. | |
| 3,850,261 | A | * | 11/1974 | Hehmann | F02C 7/24 181/286 |
| 3,913,702 | A | * | 10/1975 | Wirt | B64D 33/06 181/286 |
| 4,113,053 | A | * | 9/1978 | Matsumoto | E01F 8/0076 181/284 |
| 4,257,998 | A | * | 3/1981 | Diepenbrock, Jr. | B29C 33/52 181/222 |
| 4,298,090 | A | * | 11/1981 | Chapman | F02C 7/24 181/286 |
| 4,475,624 | A | * | 10/1984 | Bourland, Jr. | E04C 2/365 181/213 |
| 5,041,323 | A | | 8/1991 | Rose et al. | |

(Continued)

FOREIGN PATENT DOCUMENTS

| GB | 2252075 | 7/1992 |
| WO | 2014200499 | 12/2014 |

OTHER PUBLICATIONS

Extended European Search Report dated May 31, 2016 in European Application No. 16153135.5.

*Primary Examiner* — Forrest M Phillips
(74) *Attorney, Agent, or Firm* — Snell & Wilmer L.L.P.

(57) ABSTRACT

A nacelle may include a noise suppressing structure. The noise suppressing structure may utilize a noise suppressing cells situated between a perforated layer of material and a non-perforated layer of material. The noise suppressing cells may have a first portion and a second portion separated by a septum. The first portion may contact the septum at an obtuse angle and the second portion may contact the septum at a reflex angle.

12 Claims, 7 Drawing Sheets

(56) References Cited

U.S. PATENT DOCUMENTS

| | | | |
|---|---|---|---|
| 5,923,003 A | 7/1999 | Arcas et al. | |
| 6,179,086 B1* | 1/2001 | Bansemir | G10K 11/172 181/198 |
| 6,439,340 B1* | 8/2002 | Shirvan | G10K 11/172 181/213 |
| 6,615,576 B2* | 9/2003 | Sheoran | B64D 33/06 181/213 |
| 7,854,298 B2* | 12/2010 | Ayle | F02C 7/045 181/288 |
| 2002/0036115 A1* | 3/2002 | Wilson | B32B 3/20 181/292 |
| 2006/0219475 A1* | 10/2006 | Olsen | B64D 33/02 181/214 |
| 2007/0272483 A1* | 11/2007 | Morin | F02C 7/045 181/292 |
| 2009/0277714 A1* | 11/2009 | Putnam | F02K 1/827 181/213 |
| 2013/0251510 A1 | 9/2013 | Runyan | |
| 2014/0090923 A1 | 4/2014 | Murray | |
| 2015/0110603 A1 | 4/2015 | Biset et al. | |
| 2015/0292413 A1* | 10/2015 | Soria | F02K 1/827 181/290 |

\* cited by examiner

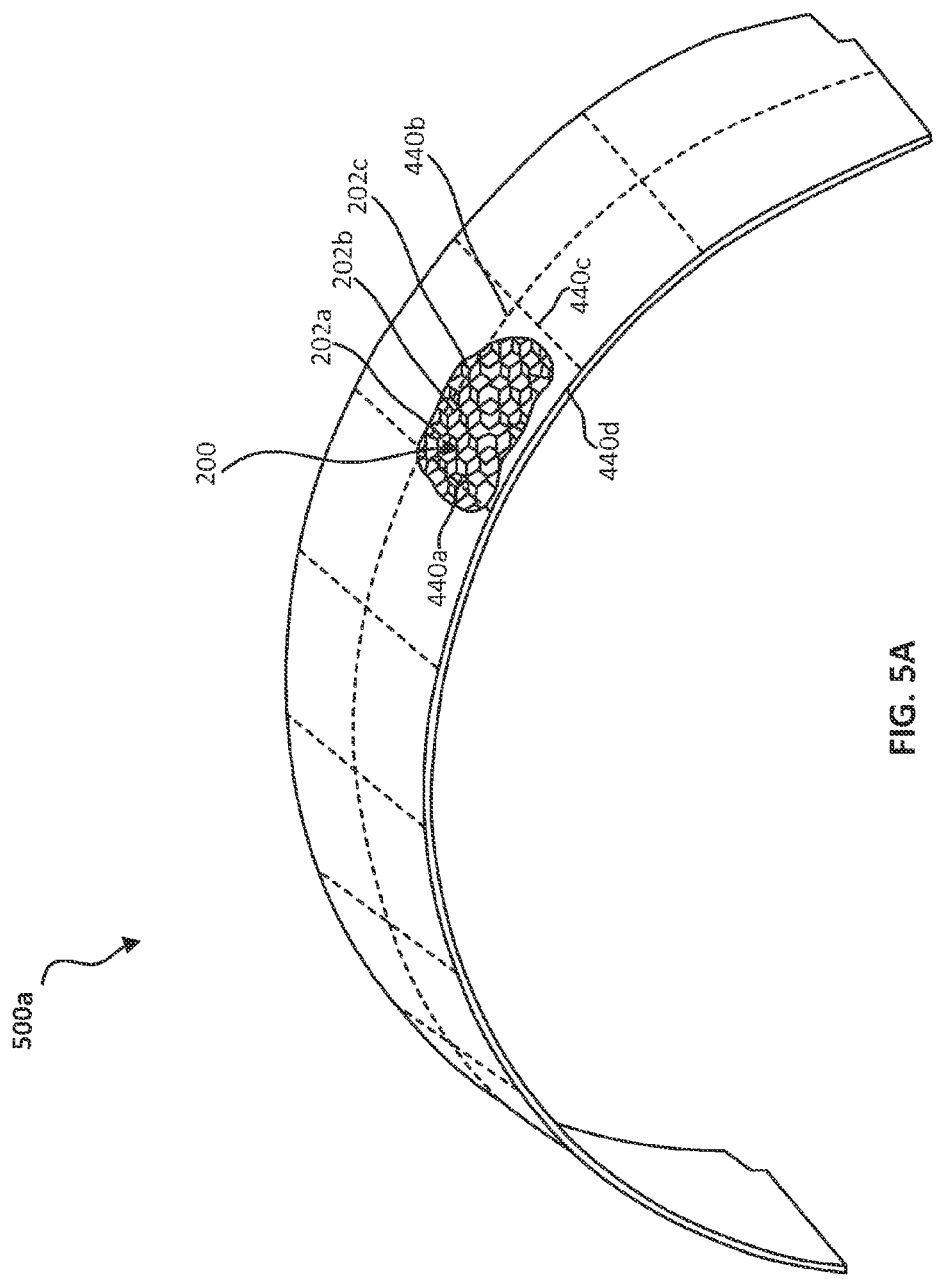

US 9,650,963 B2

ACOUSTIC STRUCTURAL PANEL WITH HERRINGBONE CORE

FIELD

The present disclosure relates to acoustic panels for suppressing noise emissions from, for example, a gas propulsion engine on an aircraft, and, more particularly, acoustic panels capable of suppressing lower frequency noises without becoming too thick.

BACKGROUND

Propulsion systems for gas turbine engines, such as those that power modern commercial aircraft, typically include noise suppressing structural panels. These structural panels are typically comprised of a plurality of cellular structures or cells between two skins. These cells are often arranged in a lattice, such as a lattice resembling a plurality of "honeycomb" shaped cells. These noise suppressing structures may be utilized in engine components such as nacelles.

Nacelle designs are trending towards larger fan diameters and thinner architectures, reducing the room for effective acoustic treatment. The lower rotational speeds of larger fan diameters are associated with lower frequency and the increased size of the blades could potentially generate significant tonal noise levels, and typically, thicker panels would be needed to target these frequencies. However, increased thickness means heavier acoustic panels, and more importantly, an increased thickness of an acoustic panel means the overall diameter of the nacelle increases, increasing the size and weight of the entire structure.

SUMMARY

In various embodiments, an aircraft nacelle may comprise a first noise suppressing cell comprising a first cell portion and a second cell portion and positioned between a perforated first layer of material and a septum, wherein the first cell portion contacts the septum at an obtuse first angle relative to the septum, and the second cell portion contacts the septum at a reflex second angle relative to the septum. The septum may be positioned between the perforated first layer of material and the second non-perforated layer of material at a septum distance. The septum distance may be between about 0.40 and 0.60. The first noise suppressing cell may comprise a hexagonal cross-sectional profile and/or one of: a quadrilateral cross-sectional profile, a triangular cross-sectional profile, an octagonal cross-sectional profile, or a circular cross-sectional profile. The obtuse first angle may comprise an angle between about 110 degrees and about 165 degrees. The reflex second angle may comprise an angle between about 200 degrees and about 255 degrees. The noise suppressing structure may comprise a support structure comprising a plurality of support members, and the first noise suppressing cell may be situated within the support structure. The noise suppressing structure may be incorporated within a jet engine nacelle. A wall of the first noise suppressing cell may define a cell depth, wherein the cell depth is between about one inch and about three inches.

In various embodiments, a nacelle for a jet engine may comprise a first noise suppressing cell comprising a first cell portion and a second cell portion positioned between a perforated first layer of material and a septum, wherein the first cell portion contacts the septum at an obtuse first angle relative to the septum, the second cell portion contacts the septum at a reflex second angle relative to the septum, and the first noise suppressing cell is situated within a support structure defined by a plurality of intersecting support members, and wherein the septum is positioned between the perforated first layer of material and the second non-perforated layer of material at a septum distance. The septum distance may be between about 0.40 and 0.60. The first noise suppressing cell may comprise a hexagonal cross-sectional profile and/or one of: a quadrilateral cross-sectional profile, a triangular cross-sectional profile, an octagonal cross-sectional profile, or a circular cross-sectional profile. The obtuse first angle may comprise an angle between about 110 degrees and about 165 degrees, and the reflex second angle may comprise an angle between about 200 degrees and about 255 degrees.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIG. 5A illustrates, in accordance with various embodiments, a perspective view of a nacelle comprising a quadrilateral support structure.

DETAILED DESCRIPTION

Figure 1:
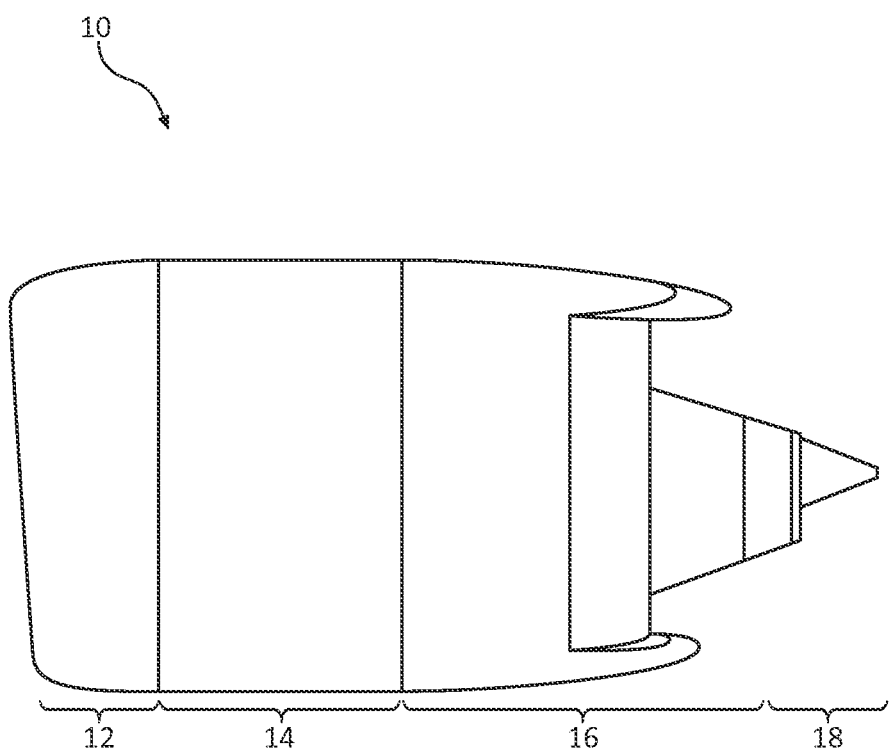
FIG. 1 illustrates, in accordance with various embodiments, a side view of a nacelle capable of including a plurality of noise suppression structures.

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of the gas turbine. As used herein, "forward" refers to the directed associated with the nose (e.g., the front end) of an aircraft, or generally, to the direction of flight or motion.

A gas turbine engine may include noise suppressing structures. These structures may be comprised of a plurality cellular structures or cells. These cells may be arranged in a lattice, such as a lattice resembling a plurality of "honeycomb" shaped cells. Each cell may act in concert with one or more other cells as part of the larger noise suppressing structure to cancel or suppress noise generated by a gas turbine engine. Cells may be situated between a first layer of material and a second layer of material. Either layer of material may comprise a plurality of perforations through which a sound wave may enter. However, typically, only one of these layers includes perforations. Further, a septum may be positioned between the first layer of material and the second layer of material, separating the cells into a first cell portion and a second cell portion.

As used herein, "cell depth" may refer to a length of a cell wall formed between the first layer of material and the second layer of material. Cell depth is selected in order to tune the noise attenuation to the desired frequency or frequency range. More particularly, a higher frequency sound wave may be suppressed by a noise suppressing structure having a first cell depth, while a lower frequency sound wave may be suppressed by a noise suppressing structure having a second, greater, cell depth (as a sound wave decreases in frequency, wavelength increases). Noise suppressing structures are therefore generally designed with a particular engine structure and location in mind, as the acoustic frequencies generated by a specific engine component may differ in frequency from those generated by a different engine component.

Noise suppressing structures are often incorporated variously throughout jet engine nacelles. In particular, one or more noise suppressing structures may be incorporated about an inner and/or outer surface of a wall of a nacelle. The thickness of the nacelle wall is limited, which in turn limits the cell wall depth of an acoustic panel positioned within the nacelle.

With reference to FIG. 1, a noise suppressing structure may be incorporated in any suitable location in or near a jet engine and/or within or about a nacelle 10 of a jet engine. For example, a noise suppressing structure may be incorporated within or about an inlet portion 12, a thrust reverser portion 16 of a nacelle 10, and/or an exhaust portion 18 of a nacelle 10.

Figure 2:
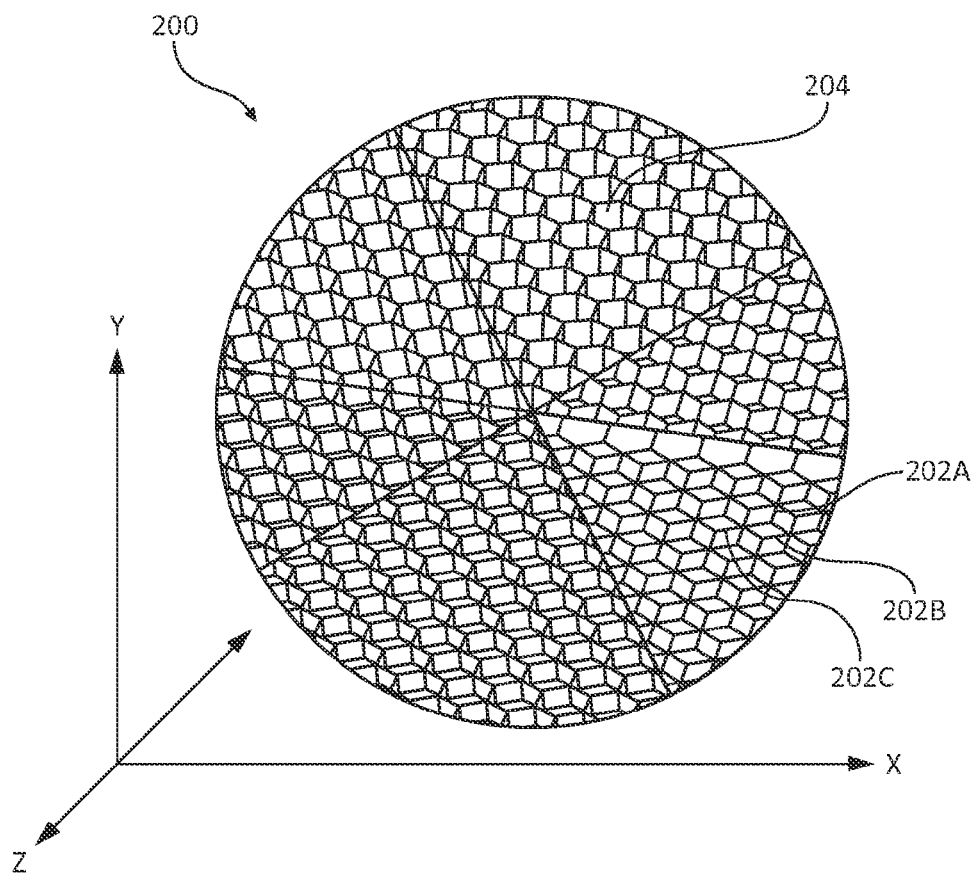
FIG. 2 illustrates, in accordance with various embodiments, a top perspective view of a segment of a noise suppressing structure.

With reference to FIG. 2, in various embodiments, a noise suppressing structure 200 may, as described herein, be capable of suppressing low frequency sound, even as a cell depth associated with the noise suppressing structure 200 is reduced. Noise suppressing structure 200 may, for example, comprise one or more cellular structures or cells, such as, cells 202a, 202b, and 202c. These cells 202a, 202b, and 202c may be arranged in a lattice 204 having a variety of cross-sectional profiles (e.g., hexagonal, octagonal, quadrilateral, triangular, circular, and the like). Further, lattice 204 may also comprise, for example, a "honeycomb" shaped structure.

Figure 3:
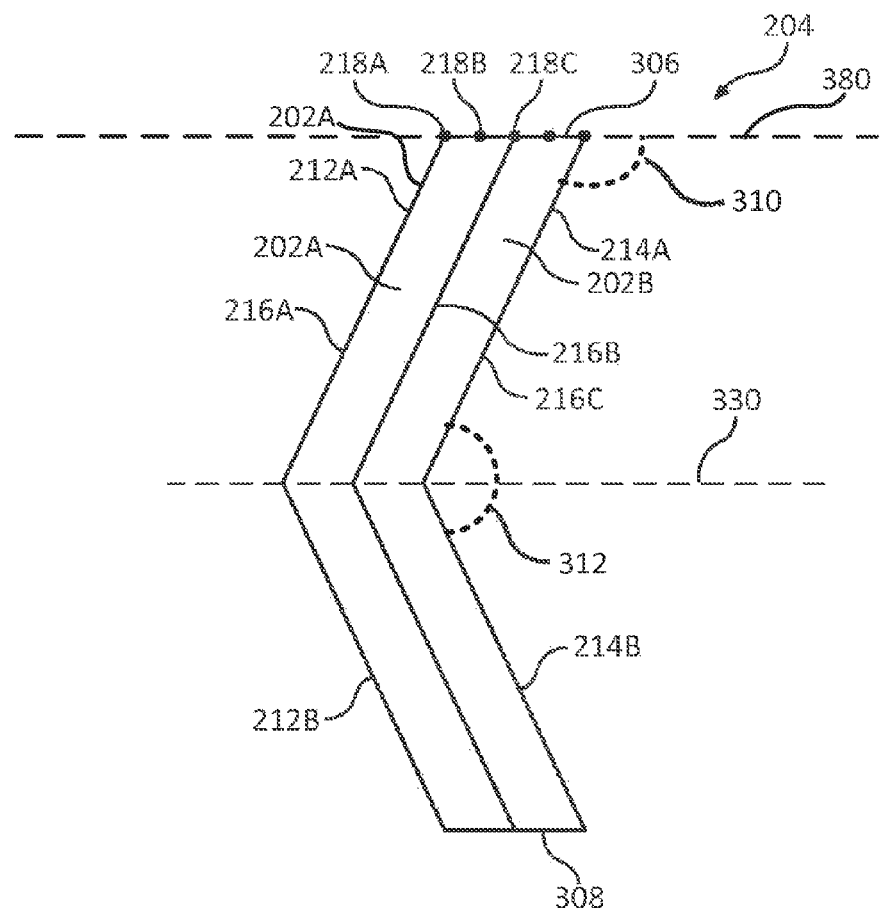
FIG. 3 illustrates, in accordance with various embodiments, a partial cross-sectional view of a plurality of noise suppressing cells.

With reference to FIG. 3, each cell 202a and 202b may be situated between and/or coupled to a first layer of material 306 and a second layer of material 308. In various embodiments, either of a first layer 306 and/or a second layer 308 may comprise any of a variety of thin films, or "skins."

Either first layer of material 306 and/or second layer of material 308 may further comprise a plurality of perforations or holes through which a sound wave may enter. However, in various embodiments, only one of first layer of material 306 and second layer of material 308 includes perforations. Thus, as shown, in various embodiments, first layer 306 may comprise one or more perforations, such as, perforations 218a, 218b, and/or 218c. Therefore, as used herein, first layer 306 may be referred to as a "perforated skin" or "top skin." Likewise, second layer of material 308 may be referred to herein as a "back skin."

In various embodiments, noise suppressing cells may comprise a first cell portion and a second cell portion. For example, cell 202a may comprise a first cell portion 212a and a second cell portion 212b. Further, cell 202b may comprise a first cell portion 214a and a second cell portion 214b. In various embodiments, first cell portion 212a and/or 214a are in fluid communication with each other, and essentially form a single cell (e.g., cell 202a and/or 202b). Air entering first layer 306 may pass through first cell portion 212a and/or 214a, into second cell portion 212b and/or 214b, and back to exit first layer 306.

Lattice 204 may further comprise, for example, a septum 330. In various embodiments, septum 330 is positioned between first layer 306 and second layer 308. For example, septum 330 may be positioned such that first layer 306 and second layer 308 have the same depth. Further, the septum may be positioned between approximately 20% and 80% of the depth from first layer 306 to second layer 308, between approximately 30% and 70%, and between about 40% and 60% of the depth between first layer 306 and second layer 308. Any position of septum 330 between first layer 306 and second layer 308 is within the scope of the present disclosure.

Septum 330 may comprise, for example, a perforated material. In various embodiments, septum 330 comprises a perforated metal sheet, or a metal mesh or screen-like material, or it could be fashioned in other ways out of different materials as will be apparent to those of skill in this art. Further, septum 330 may comprise the same material as first layer 306 and/or second layer 308.

In various embodiments, septum 330 separates first cell portion 212a and/or 214a from second cell portion 212b and/or 214b. For example, a cross-section of a portion of lattice 204 is illustrated in FIG. 3A. For example, a plane 380 tangent to nacelle 10 at first layer 306 may form a first angle 310 with first cell portion 212a and/or 214b at the point which the first cells contact first layer 306. In various embodiments, first angle 310 may range from about 20 degrees to about 160 degrees, from 30 degrees to about 150 degrees, and further, from about 110 to about 165 degrees (in this context, the term "about" reflects the difficulty in accurately measuring the various angles, and is equivalent to the term "approximate"). In embodiments in which first angle 310 is not equal to about 90 degrees (i.e., first cell portions 212a and/or 214a are not orthogonal to plane 380), first cell 202a and/or second cell 202b may be referred to as "slanted" or "slanting."

Second cell portions 212b and/or 214b of cells 202a and/or 202b may, for example, be positioned such that each of the cell walls of second cell portion 212b and/or 214b forms a relative angle 312 with first cell portions 212a and/or 212b. For example, relative angle 312 may range from about 20 degrees to about 270 degrees, about 60 to about 180 degrees, and further, about 75 to about 135 degrees. In embodiments in which first angle is about 90 degrees, relative angle 312 will be less than or greater than (i.e., not equal to) 180 degrees.

Although first cell portions 212a and 214 are illustrated as aligning with second cell portions 212b and 214b, various cell portions may be out of alignment with each other. Specifically, first cell portions (212a and 214a) and second cell portions (212b and 214b) may be shifted with relation to one another along septum 330 (i.e., in the X direction of FIG. 3).

Figure 4A:
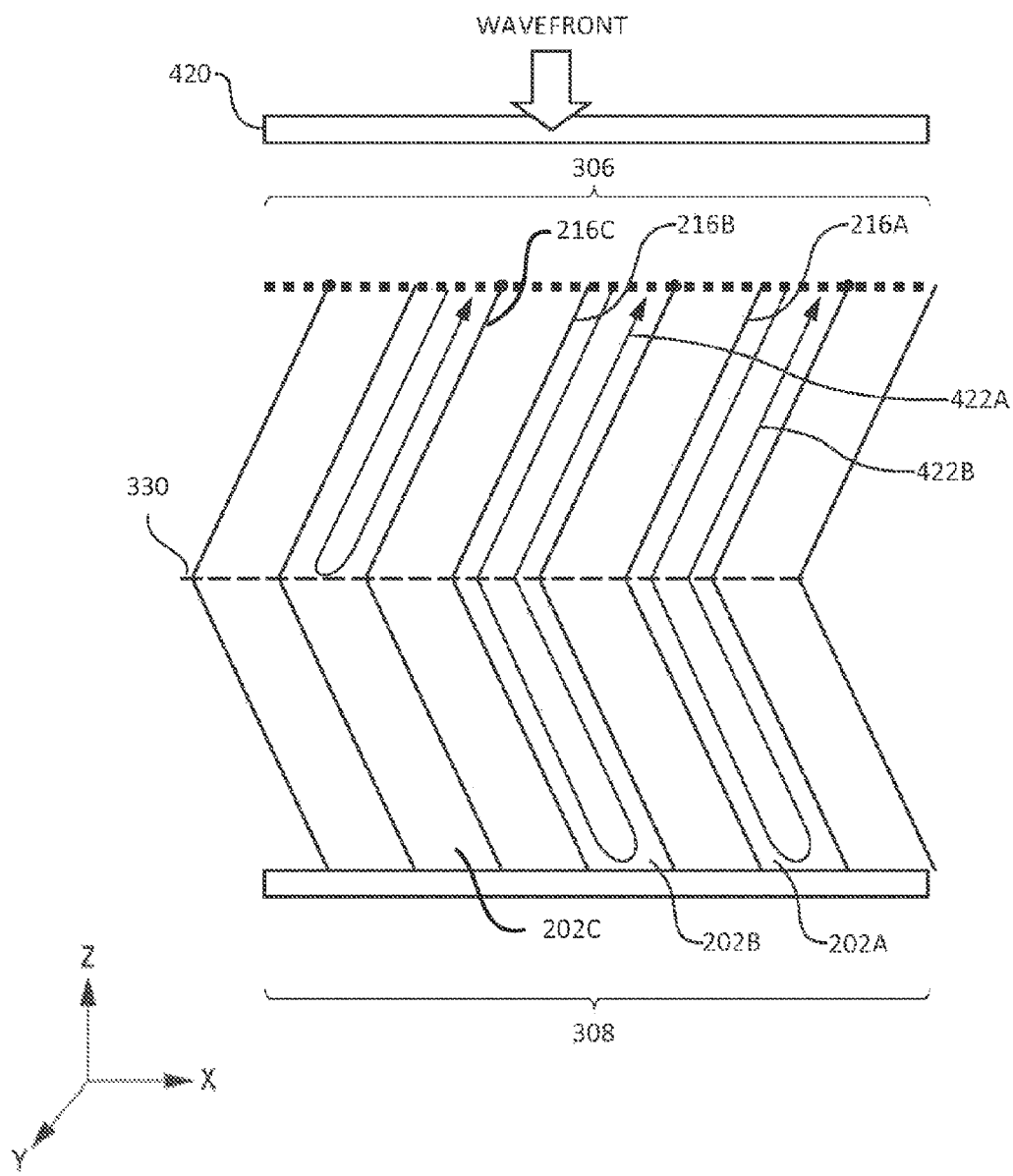
FIG. 4A illustrates, in accordance with various embodiments, a cross-sectional view of a plurality of noise suppressing cells reflecting a wave front.

With reference to FIG. 4A, sound waves 420 may enter cells 202a-202d of lattice 204 through perforations in first layer 306. As sound waves 420 travels through each cell, it may pass through septum 330 (as illustrated in cells 202a and 202b) or be reflected by septum 330 (as illustrated in cells 202c and 202d). Sound waves 420 passing through septum 330 are reflected from second layer 308 to exit through perforations in first layer 306. As such, the structure of cells 202a-202d provides a dual degree of freedom design, as will be recognized by those of ordinary skill in this art, and attenuates noise at two effective frequencies or around two frequency bands.

Distances 422a and/or 422b that sound wave 420 travels through cells 202a and/or 202b is greater than, for example, distances that sound wave 420 would travel through a cell having walls orthogonal to first layer 306, second layer 308, and/or septum 330. In various embodiments, the length of walls 216a, 216b, and/or 216c may define a cell depth of a slanted cell or a "slanted cell depth." In various embodiments, slanted cell depths may range from about 0.5 to about 5 inches, and further, about 1 inch to about 4 inches.

Thus, cells 202a and/or 202b may cancel or suppress sound wave 420 having a lower frequency than cells having walls, for example, which are orthogonal to first layer 306 and/or second layer 308. In addition, first angle 310 and relative angle 312 may be varied (increased or decreased) to adjust for a particular acoustic frequency. For example, first angle 310 and relative angle 312 may be adjusted to suppress increasingly lower acoustic frequencies. Therefore, cells 202a and 202b may successfully suppress low frequency sound generated by large jet engines, including jet engines utilizing large diameter turbofans.

In various embodiments, slanted cells 202a and 202b may be used in combination with other types of cells. For example, slanted cells 202a and 202b may be used with cells which are oriented orthogonally relative to first layer 306 and/or second layer 308. In various embodiments, slanted cells 202a and 202b may be used with other slanted cells, including those having different characteristics as those of slanted cells 202a and 202b. The use of any combination of cells along with slanted cells 202a and 202b, including solely using cells 202a and 202b, is with the scope of the present disclosure.

Figure 4B:
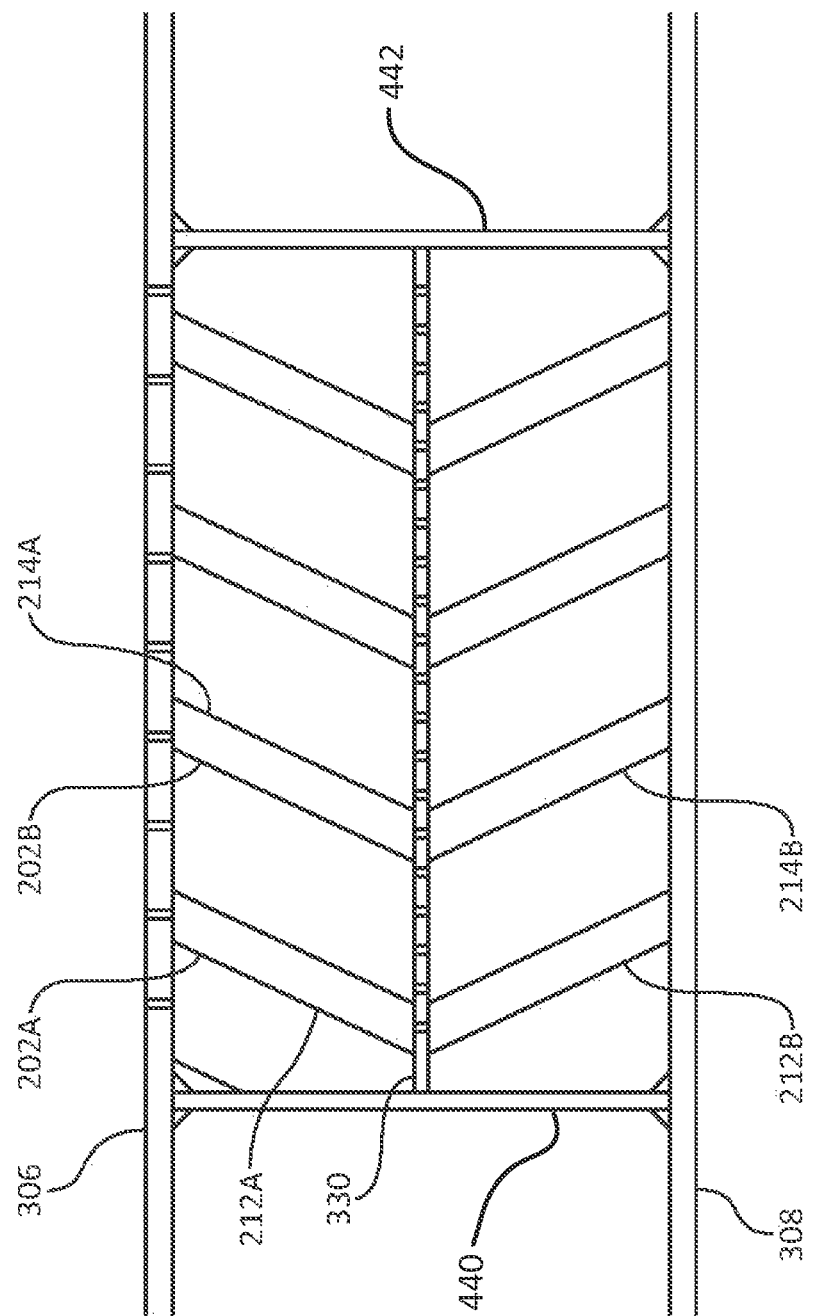
FIG. 4B illustrates, in accordance with various embodiments, a cross-sectional view of a plurality of noise suppressing cells.

With reference to FIG. 4B, cells 202a and 202b may be situated within a support structure comprising a plurality of support members (or "ribs"), such as for example, ribs 440 and 442. In various embodiments, ribs 440 and 442 provide structural support in the direction perpendicular to first layer 306 and second layer 308. As such, a plurality of cells (including cells 202a and 202b) may be positioned between two or more ribs (such as ribs 440 and 442). Ribs 440 and 442 may define a load path between first layer 306 and second layer 308, and may "buttress" the wall structure of slated cells 202a, 202b, etc comprising noise suppressing structure 200. When compressive forces are applied to structure 200 in the thickness direction, the core material defining the walls of the cells may collapse and not provide adequate structure resistance to such crushing loads. The reinforcement rib structure including ribs 440, 442 will reinforce the core and prevent it from collapsing by laterally supporting the ribs and preventing shearing motion which would accompany the collapse. Ribs 440 and/or 442 may comprise any of a variety of suitable materials, including, for example, a woven and/or layered material, such as a woven and/or layered composite materials.

Figure 5B:
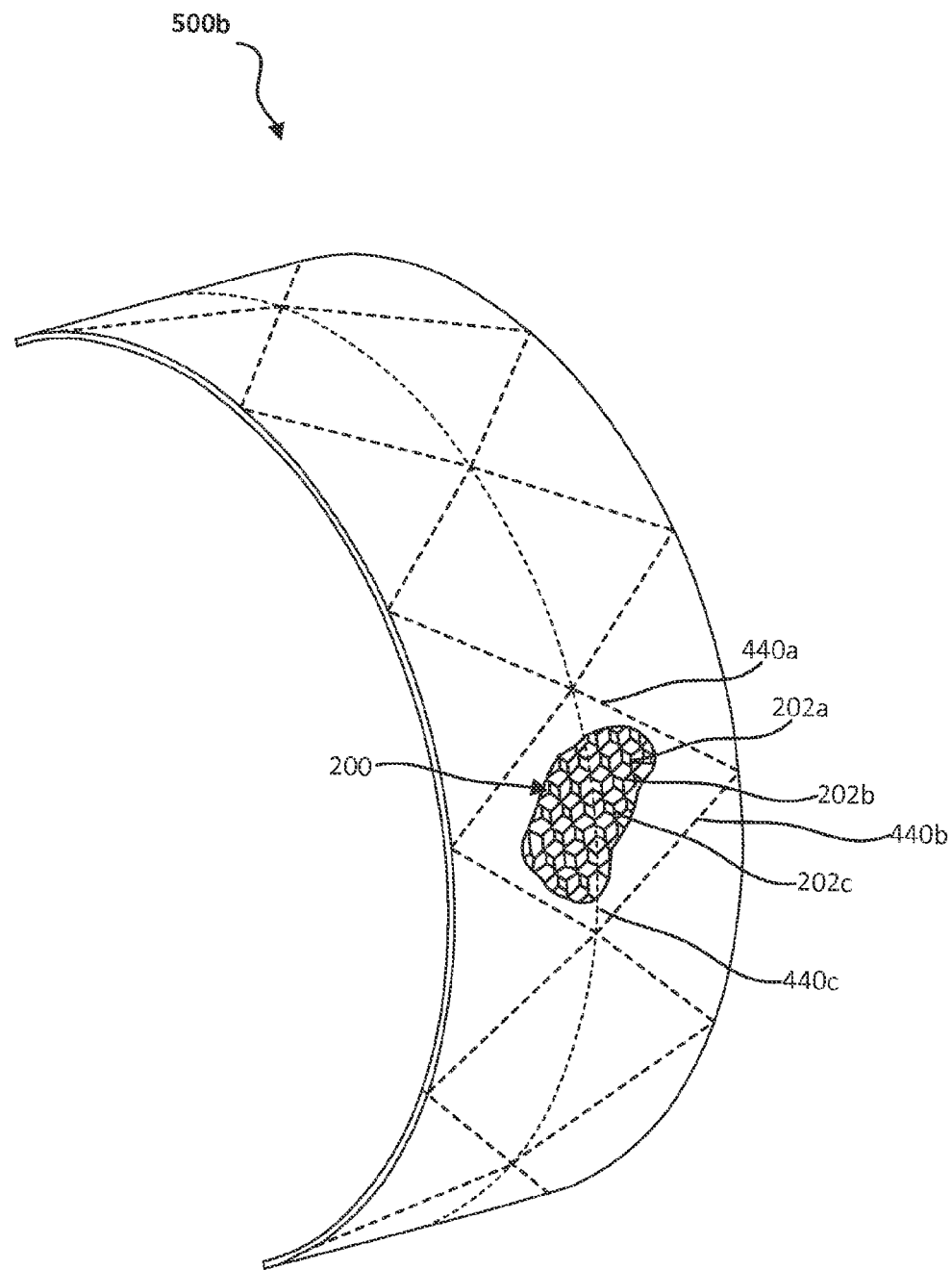
FIG. 5B illustrates, in accordance with various embodiments, a perspective view of a nacelle comprising a trilateral support structure.

With reference to FIG. 5A, a nacelle 500A may comprise a plurality of noise suppressing structures, such as for example, noise suppressing structures 200. As described herein, noise suppressing structure 200 may include a plurality of cells such as slanted cells 202a, 202b, and 202c. Ribs 440a, 440b, 440c, and 440d may intersect, in various embodiments, to form any of a variety of geometries. For example, as shown at FIG. 5A, the support structure formed by ribs 440a, 440b, 440c, and 440d may comprise a quadrilateral (e.g., rectangular) geometry. Similarly, as shown at FIG. 5B, a nacelle 500B may comprise or may include a support structure comprising a trilateral (e.g., triangular) geometry. Further, in various embodiments, a support structure (not shown) may comprise a hexagonal and/or octagonal geometry, such as an isostatic hexagonal geometry. In various embodiments, a support structure may comprise a combination of any of the foregoing geometries as well and/or any other suitable geometry.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A noise suppressing structure comprising:
a first noise suppressing cell comprising a first cell portion positioned between a perforated first layer of material and a septum and a second cell portion positioned between the septum and a second layer of material,
wherein the first cell portion intersects the perforated first layer of material at a first angle relative to the first layer, and the second cell is positioned relative to the first cell portion at a second relative angle,
the first angle comprises an angle between about 110 degrees and about 165 degrees, and
the relative angle comprises an angle between about 70 degrees and about 135 degrees.

2. The noise suppressing structure of claim 1, wherein the septum is positioned between the perforated first layer of material and the second non-perforated layer of material at a septum distance.

3. The noise suppressing structure of claim 2, wherein the septum is positioned between about 40% and 60% of the depth between the first and second layers of material.

4. The noise suppressing structure of claim 1, wherein the first noise suppressing cell comprises a hexagonal cross-sectional profile.

5. The noise suppressing structure of claim 1, wherein the first noise suppressing cell comprises at least one of a quadrilateral cross-sectional profile, a triangular cross-sectional profile, an octagonal cross-sectional profile, or a circular cross-sectional profile.

6. The noise suppressing structure of claim 1, further comprising a support structure comprising a plurality of support members, wherein the first noise suppressing cell is situated within the support structure.

7. The noise suppressing structure of claim 6, wherein the noise suppressing structure is incorporated within a jet engine nacelle.

8. The noise suppressing structure of claim 1, wherein a wall of the first noise suppressing cell defines a cell depth, wherein the cell depth is between about one inch and about three inches.

9. A nacelle for a jet engine comprising:
a first noise suppressing cell comprising a first cell portion positioned between a perforated first layer of material and a septum and a second cell portion positioned between the septum and a second layer of material,
wherein the first cell portion contacts the perforated first layer of material at a first angle relative to the first layer of material, the second cell portion contacts the first cell portion at a relative angle, and the first noise suppressing cell is situated within a support structure defined by a plurality of intersecting support members, and
wherein the septum is positioned between the perforated first layer of material and the second non-perforated layer of material at a septum distance, and
the obtuse first angle comprises an angle between about 110 degrees and about 165 degrees and relative angle comprises an angle between about 70 degrees and about 135 degrees.

10. The nacelle for a jet engine of claim 9, wherein the septum distance is between about 0.40 and 0.60.

11. The nacelle for a jet engine of claim 9, wherein the first noise suppressing cell comprises a hexagonal cross-sectional profile.

12. The nacelle for a jet engine of claim 9, wherein the first noise suppressing cell comprises one of: a quadrilateral cross-sectional profile, a triangular cross-sectional profile, an octagonal cross-sectional profile, or a circular cross-sectional profile.

* * * * *